United States Patent
Menon

(10) Patent No.: US 12,262,315 B2
(45) Date of Patent: *Mar. 25, 2025

(54) METHOD AND SYSTEM FOR POWER MANAGEMENT BASED ON FULL RF CONDITIONS

(71) Applicant: DISH Wireless L.L.C., Englewood, CO (US)

(72) Inventor: Anand Menon, Englewood, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/504,794

(22) Filed: Nov. 8, 2023

(65) Prior Publication Data
US 2024/0073814 A1    Feb. 29, 2024

Related U.S. Application Data

(63) Continuation of application No. 17/032,062, filed on Sep. 25, 2020, now Pat. No. 11,849,390.
(Continued)

(51) Int. Cl.
*H04W 52/02* (2009.01)
*H01Q 1/24* (2006.01)
*H02J 9/06* (2006.01)

(52) U.S. Cl.
CPC ........ *H04W 52/0206* (2013.01); *H01Q 1/246* (2013.01); *H02J 9/06* (2013.01)

(58) Field of Classification Search
None
See application file for complete search history.

(56) References Cited

U.S. PATENT DOCUMENTS

| | | | |
|---|---|---|---|
| 5,410,740 A | * | 4/1995 | Hagstrom ............. H04W 88/08 455/67.11 |
| 8,729,732 B2 | | 5/2014 | Fischer |

(Continued)

FOREIGN PATENT DOCUMENTS

| | | |
|---|---|---|
| JP | 2012156724 A | 8/2012 |
| JP | 5645803 B2 | 12/2014 |

(Continued)

OTHER PUBLICATIONS

European Patent Office—International Searching Authority, International Search Report mailed Jun. 28, 2021, for International Application No. PCT/US2021/022773.

*Primary Examiner* — Liem H. Nguyen
(74) *Attorney, Agent, or Firm* — KW Law, LLP

(57) ABSTRACT

Systems, devices and automated processes are provided for prolonging backup battery power for RF radio operations at a base station, including a radio controller configured to control routing of power from the backup battery; a detection unit for determining whether a source of commercial power is about to or has failed; a control unit located remotely to communicate with an RF radio controller, a server, and router to change a setting of a required level to reduce the power to the cell; a feedback mechanism responsive to the loss of power to crop the input power; an output control unit to reduce the output power from the RF radio; and a battery controller configured to reduce the draw on the UPS since input power requirement are dropped.

20 Claims, 3 Drawing Sheets

Related U.S. Application Data

(60) Provisional application No. 62/992,352, filed on Mar. 20, 2020.

(56) References Cited

U.S. PATENT DOCUMENTS

| | | | |
|---|---|---|---|
| 9,479,209 B2 | 10/2016 | Yang et al. | |
| 9,647,494 B2 * | 5/2017 | Hui | H04L 45/28 |
| 10,506,460 B2 | 12/2019 | Tapia | |
| 2002/0033692 A1 | 3/2002 | Sakai et al. | |
| 2007/0066329 A1 | 3/2007 | Laroia et al. | |
| 2007/0191051 A1 | 8/2007 | Suonvieri | |
| 2009/0232037 A1 | 9/2009 | Dixit et al. | |
| 2010/0009694 A1 * | 1/2010 | Fischer | H04W 52/0206 |
| | | | 455/452.1 |
| 2012/0293002 A1 * | 11/2012 | Ye | H02J 9/06 |
| | | | 429/61 |
| 2012/0302295 A1 * | 11/2012 | Bishop | H04L 41/147 |
| | | | 455/574 |
| 2013/0231156 A1 * | 9/2013 | Fischer | H04W 52/0206 |
| | | | 455/552.1 |
| 2013/0288681 A1 | 10/2013 | Hamalainen et al. | |
| 2013/0329544 A1 | 12/2013 | Griffioen et al. | |
| 2015/0365890 A1 | 12/2015 | Rajendran et al. | |
| 2016/0142192 A1 | 5/2016 | Damnjanovic et al. | |
| 2018/0176861 A1 | 6/2018 | Chamberlain et al. | |
| 2019/0280518 A1 | 9/2019 | Titus et al. | |
| 2019/0391192 A1 * | 12/2019 | Winkler | H04W 52/0274 |
| 2020/0351771 A1 * | 11/2020 | Geekie | H04W 76/30 |
| 2021/0135485 A1 | 5/2021 | Demaree | |

FOREIGN PATENT DOCUMENTS

| | | |
|---|---|---|
| WO | 2009151388 A2 | 12/2009 |
| WO | 2020001129 A1 | 1/2020 |

* cited by examiner

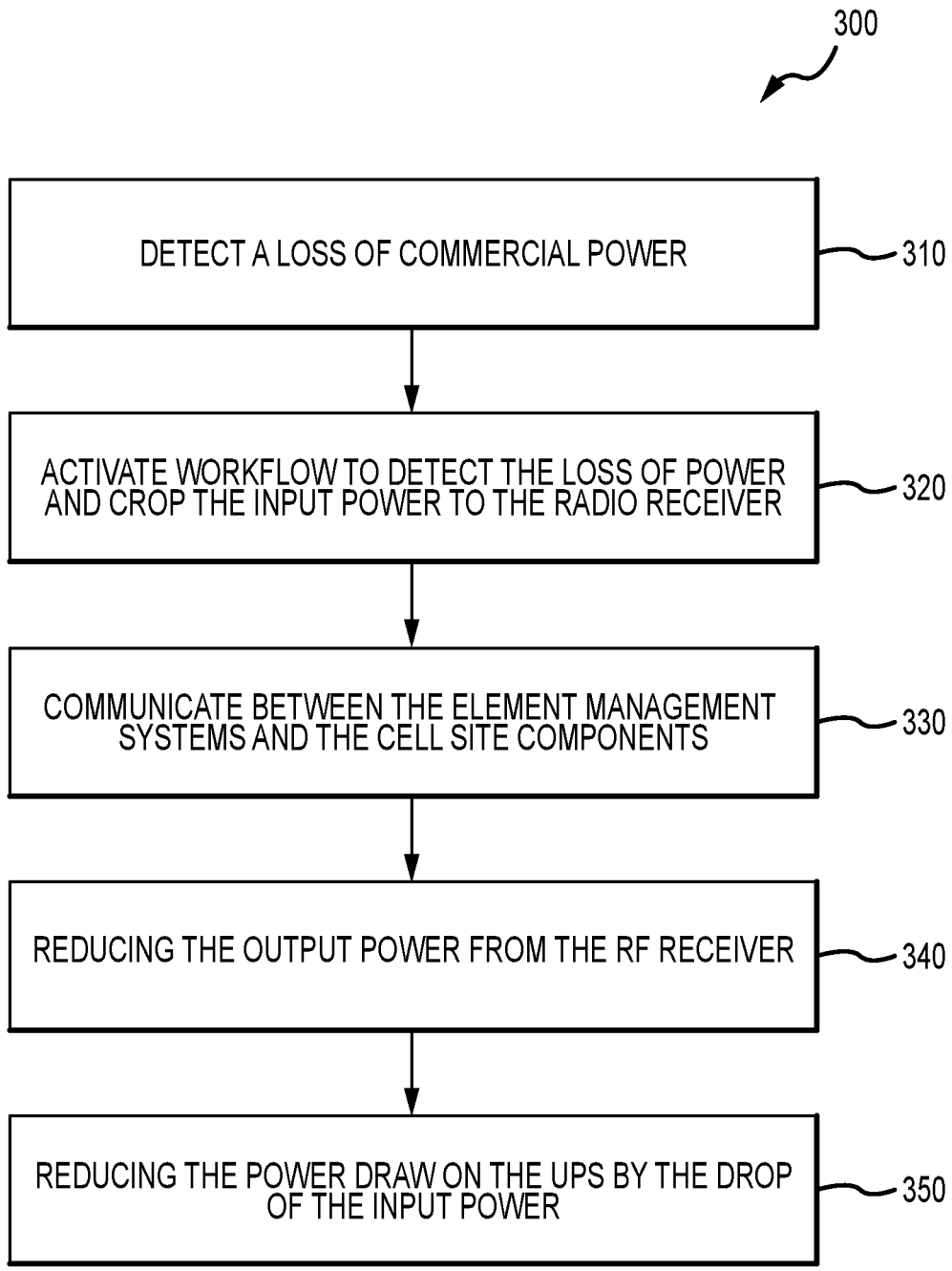

METHOD AND SYSTEM FOR POWER MANAGEMENT BASED ON FULL RF CONDITIONS

CROSS-REFERENCE TO RELATED APPLICATIONS

This application is a continuation of U.S. patent application Ser. No. 17/032,062 filed on Sep. 25, 2020, which claims priority to U.S. Provisional Patent Application Ser. No. 62/992,352 filed on Mar. 20, 2020, the contents of which are hereby incorporated by reference.

TECHNICAL FIELD

The following discussion generally relates to power management in wireless communications systems. More particularly, the following discussion relates to systems, devices, and automated processes that reduce power drawn by radio frequency (RF) radios based on commercial power interrupts or failures in 5G data networks or the like by changing a current RF radio operating load to reduce the level of the input power draw of the base station in response to the commercial power interrupt or failure thereby increasing the operating time of the switched backup uninterruptible power supply (UPS).

BACKGROUND

Newer 5G data and telephone networks are being developed to provide greatly improved bandwidth and quality of service to mobile telephones, computers, internet-of-things (IoT) devices, and the like. As these newer high-bandwidth networks evolve, however, additional challenges are being recognized. A 5G base station is generally expected to consume roughly three times as much power as a 4G base station. And more 5G base stations are needed to cover the same area.

Today RF radios and antennas use a fixed input power that is based on full load RF conditions. When commercial power is interrupted, lost or dramatically reduced, the RF radio is not able to receive notice to modulate its power consumption accordingly. In other words, the RF is not informed nor is the RF radio configured to be informed of a commercial power loss and can change or drop its preconfigured input power requirements. The inability to change the input power requirements of the RF radio result in lower performance in its operation by causing a faster drain on its battery backup systems.

It is desirable to change required levels on the input power setting of the RF radio in response to feedback messages of detected input commercial power level changes or interrupts by the RF radio to reduce the operating RF radio power consumption. The RF radio operating power setting is reduced based on the immediate operational requirements including determinations of the available RF service on the antenna/radio to provide for a prolonged operating time of airtime of the antenna reception and RF radio transmitter.

It is desirable to provide systems and methods that when the RF radio of the operating cell (i.e. gNB node) incurs a drop or interrupt of commercial power at the input to the base station the operational systems are altered to compensate for the loss of commercial power to a reduce RF radio current draw.

It is desirable to provide systems and method for operating management of base stations components that enable the switching of operating load profiles or enabling automated systems to reconfigure component based on examination of the current traffic loading on the antenna to change the mode of operation of the RF radio transmitter based on evaluating if a degraded RF radio service can be implemented under the current conditions. If it is possible the RF EMS or orchestration system will execute a workflow to drop the input power requirements on the RF radio. This can reduce the current power draw that can result in increases in the amount of time the RF radios/antennas can operate in a backup UPS power mode and provide service.

It is therefore desirable to create systems, devices and automated processes that can monitor commercial power interrupts and failures and allow different configurations of base station components to operate in the desired cell network. It is also desirable to improve connectivity and operating time for base station equipment operating in backup power modes within 5G or similar networks.

Furthermore, other desirable features and characteristics of the present invention will become apparent from the subsequent detailed description and the appended claims, taken in conjunction with the accompanying drawings and the foregoing technical field and background.

BRIEF SUMMARY

Systems, devices and automated processes are provided to reduce the power draw of a backup power supply to a base station and cell site in response to a power interrupt or power loss. In an embodiment, a system for prolonging backup battery power for RF radio operations at a base station is provided. The system includes a radio controller configured to control routing of power from the backup battery; a detection unit for determining whether a source of commercial power is about to or has failed; a control unit including an element management system located remotely to communicate with an RF radio controller, a server, and router to change a setting of a required level to reduce the power to the cell; a feedback mechanism responsive to the loss of power to crop the input power; an output control unit to reduce the output power from the RF radio; and battery controller configured to reduce the draw on the UPS since input power requirement are dropped.

In various exemplary embodiments, the method further includes the element management system instructed by an automated workflow responsive to the detected loss of power. The method further includes the element management system changing settings of components based on data communicated from the cell site server. The method further includes the element management system changing settings of components of multiple cell sites based on collective data communicated by multiple cell site servers. The method further includes the element management system via logic monitoring the data of components on the cell site. The method further includes the element management system cropping input power to individual cell sites based on a scheduled operation to lessen effects of node degradations to users.

In another exemplary embodiment, a computer program product tangibly embodied in a computer-readable storage device and including a set of instructions that when executed by a processor perform a method for an operational mode of a base station when a power interrupt or power loss is detected is provided. The method includes: an element management system for implementing the operational mode of a radio receiver of a cell or base station by an automated workflow in response to collective data of a network; activating the automated workflow in response to collective data indicative of the power interrupt or the power loss to a network, cell site, and base station to crop input power to at least a radio receiver of the cell site and base station; communicating with the radio receiver and a server via a cell site router to exchange messages about requirements of components of the cell site based on current operating data of the cell site; reducing the output power of the radio receiver by changing settings of cell site components to reduce a maximum radio receiver load while taking into account data indicative of component loads in the operating cell site; and reducing an amount of power drawn by at least one back power supply activated in response to the power interrupt or power loss to extend an operation time of the backup power supply.

In various exemplary embodiments, the method further includes the element management system instructed by an automated workflow responsive to the detected loss of power. The method further includes the element management system changing settings of components based on data communicated from the cell site server. The method further includes the element management system changing settings of components of multiple cell sites based on collective data communicated by multiple cell site servers. The method further includes the element management system via logic monitoring the data of components on the cell site. The method further includes the element management system cropping input power to individual cell sites based on a scheduled operation to lessened effects of node degradations to users.

In yet another exemplary embodiment, a method executed by a network power management system having a processor, memory, and input/output interfaces, wherein the processor is configured to execute instructions stored in the memory to extend backup battery life is provided. The method includes an element management system for implementing the operational mode of a radio receiver of a cell or base station by an automated workflow in response to collective data of a network; activating the automated workflow in response to collective data indicative of the power interrupt or the power loss to a network, cell site, and base station to crop input power to at least a radio receiver of the cell site and base station; communicating with the radio receiver and a server via a cell site router to exchange messages about requirements of components of the cell site based on current operating data of the cell site; reducing the output power of the radio receiver by changing settings of cell site components to reduce a maximum radio receiver load while taking into account data indicative of component loads in the operating cell site; and reducing an amount of power drawn by at least one back power supply activated in response to the power interrupt or power loss to extend an operation time of the backup power supply.

In various exemplary embodiments, the method further includes the element management system instructed by an automated workflow responsive to the detected loss of power. The method further includes the element management system changing settings of components based on data communicated from the cell site server. The method further includes the element management system changing settings of components of multiple cell sites based on collective data communicated by multiple cell site servers. The method further includes the element management system via logic monitoring the data of components on the cell site. The method further includes the element management system cropping input power to individual cell sites based on a scheduled operation to lessened effects of node degradations to users. The method further includes the element management system including a master base station for communicating with each based station to regulate input power in response to a power loss of the network. The method further includes the network management system including a central power management system receiving collective data from the network for monitoring each cell site for power outages.

DESCRIPTION OF THE DRAWINGS

The exemplary embodiments will hereinafter be described in conjunction with the following drawing figures, wherein like numerals denote like elements, and wherein:

FIG. 3 is an exemplary flowchart for power management of a base station responsive to a commercial power interrupt or failure of the base station power management system in a wireless data networking environment in accordance with an embodiment.

DETAILED DESCRIPTION

Figure 1:
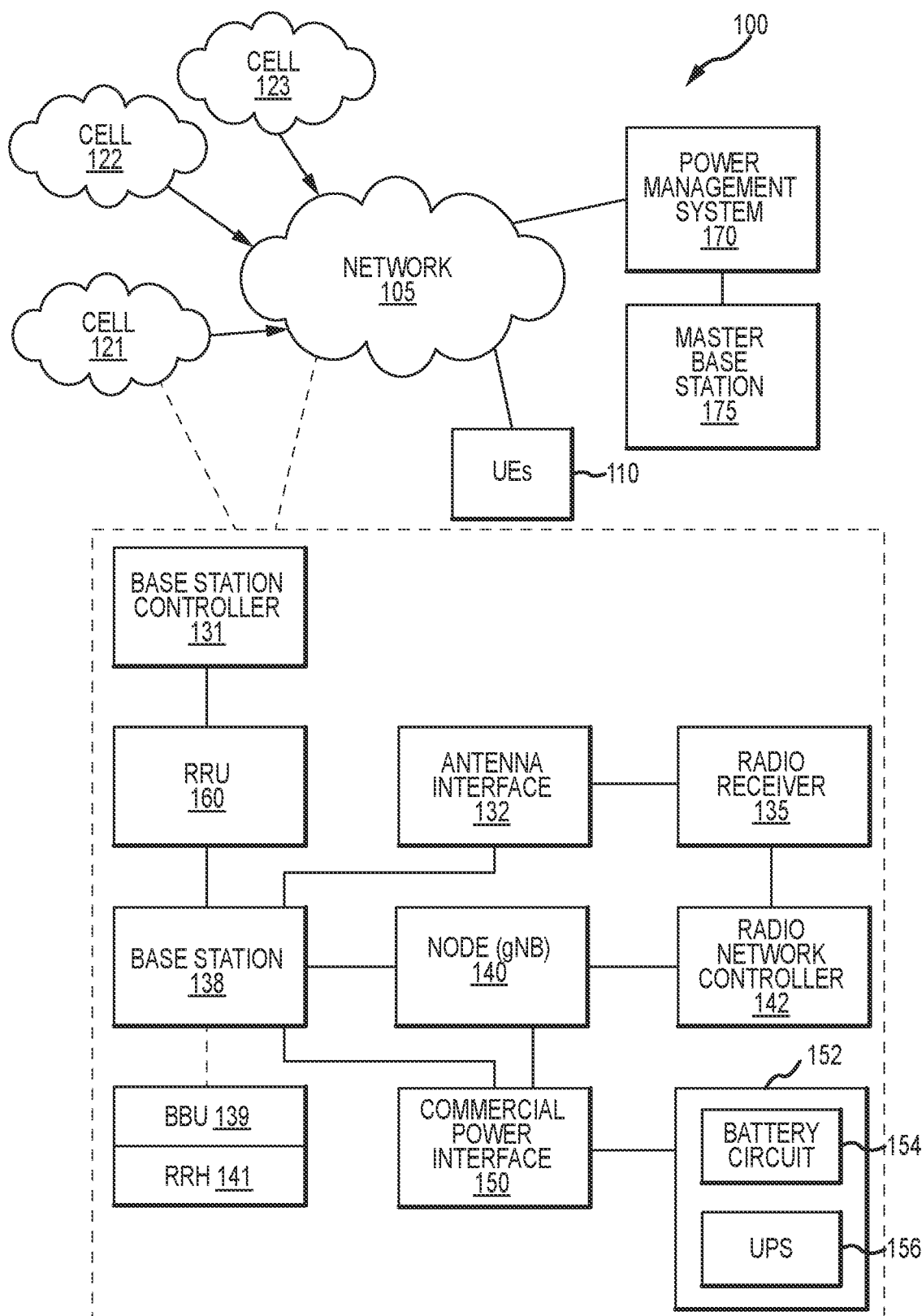
FIG. 1 is an exemplary diagram of components in a base station of the base station power management system in a wireless data networking environment in accordance with an embodiment.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Wireless mobile communication technology uses various standards and protocols to transmit data between a base transceiver station (BTS) and a wireless mobile device. The deployment of a large number of small cells presents a need for energy efficiency power management solutions in fifth-generation (5G) cellular networks. While massive multiple-input multiple outputs (MIMO) will reduce the transmission power it results in not only computational cost but for the computation required, the input power requirements for transmission can be a significant factor for power energy efficiency (especially when operating in a backup mode) of 5G small cell networks. In 3GPP radio access networks (RANs) in LTE systems, the BTS can be a combination of evolved Node Bs (also commonly denoted as enhanced Node Bs, eNodeB s, or eNBs) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

The power consumption of base stations (BS's) is classified into three types which are the transmission power, the computational power, and power for base station operation. The transmission power is the power used by the power amplifiers (PAs) and RF chains, which perform the wireless signals change, i.e., signal transforming between the baseband signals and the wireless radio signals. The computation power represents the energy consumed at baseband units (BBU's) which includes digital single processing functions, management and control functions for BS's and the communication functions among the core network and BS s. All these operations are executed by software and realized at semiconductor chips. The additional power represents the power consumed for maintaining the operation of BS's. More specifically, the additional power includes the power lost at the exchange from the power grid to the main supply, at the exchange between different direct current to direct current (DC-DC) power supply, and the power consumed for active cooling at BS's.

Power loss and outages are commonplace in networks today as a result of natural disasters, rolling brownouts, etc. Base stations include backup power (e.g., batteries), these forms of backup power may not provide sufficient power during lengthy power outages, use of commercial wireless communications services may increase due to users' needs and/or desires.

Operating the BS in a sleeping mode can be a way to reduce energy consumption in cellular networks, however, this method focuses on the output power and does not consider a loss or interrupt of the commercial power on the input to the BS. Hence, queueing decision techniques for BS sleeping techniques while can maximize energy-efficient utilization of the BS s in a green communication network is not applicable when commercial power is lost to the BS.

The physical or network node either represents an access node (e.g. Radio Distributed Units) or non-access node (e.g. servers and routers) while a physical link represents an optical fiber link between two physical nodes. Every physical node is characterized by a set of available resources, namely computation (CPU), memory (RAM), and storage which define the load characteristics of a cell. Each physical link is characterized by a bandwidth capacity and a latency value which is the time needed by a flow to traverse that link. Finally, both physical nodes and links have associated utilization power requirements for each type of available resource.

The power delivery to a BS is rectified and regulated to a nominal measured DC voltage 48 (i.e. voltage direct current (VDC)) which is fed to a backup battery or a set of backup batteries for charging. The rectifier unit includes circuitry to keep the batteries fully charged and ready in case of a commercial power interrupt or failure. At full charge, the backup battery is kept at a voltage in the vicinity of 50 volts. The battery pack parameter in general per customer's requirement is in the order or 2-hour work time under 100 W AC system, 48.1V/65 Ah battery that can last of about 150 minutes with a full load.

There are at least two scenarios in which a power outage that affects the cell site and coverage area will trigger an unexpected peak in traffic demand. First, when normal activities are interrupted caused when a high number of UEs are engaged on the wireless network and second, if Wi-Fi access points aren't functioning, requiring the UEs to use the cellular networks instead.

Base stations typically use a 48V input supply that is stepped down by DC/DC converters to 24V or 12V, then further stepped down to the many sub rails ranging from 3.3V to less than 1V to power ASICs in the baseband processing stages.

FIG. 1 shows a graphical representation of a 5G or other data networks 100 that includes multiple cells 121, 122, 123 that provide access to a network 105 for any number of UE devices 110. Although FIG. 1 shows only one user equipment (UE) device 110 for simplicity, in practice the concepts described herein may be scaled to support environments of other data networks 100 that include any number of devices 110 and/or cells 121-123, as well as any sort of network architecture for assigning bandwidth to different slices and performing other tasks, as desired.

In the example of FIG. 1, a mobile telephone or other user equipment (UE) device 110 suitably attempts to connect to network 105 via an appropriate access cell 121, 122, 123. In the illustrated example, each cell 121 includes the components for transmission of a base station controller 131, a base station transceiver 138, a node 140, an RF Radio 135, a Radio Network controller 142; the linking components of the antenna interface 132 and the antenna; and the power components of the commercial power interface 150, the backup power supply 152 of a battery circuitry 154 and UPS (or batteries) 156.

The commercial power interface 150 may receive power AC power from a public utility or other sources. The antenna and antenna interface 132 control the signal to the UEs 110. The radio network controller 142 can control the RF transmit output via the RF radio 135 to conserve power usage to reduce the power draw on the UPS 156. By reducing the communication bit rate, the RF power can be reduced in decibels ("dB"). Additionally, step reductions can be implemented. The battery circuitry 154 can be configured as a rectifier type switch that can switch the output power from the UPS 156 at multiple levels. The Base Station controller 131 can include power control features to control the power drawn by the base station controller 131. Additionally, the base station controller 131 can communicate wirelessly with a power management system 170 that can confirm the power outage or interrupt on the front end to change the power input power levels of multiple small cells 121, 122, and 123, and a number of UEs 110 connected to the Node 140 and resources in a slice of a node (gNB).

In an example embodiment, the radio network controller 142 can implement logic is implemented with computer-executable instructions stored in a memory, hard drive or other non-transitory storage of device for execution by a processor contained within. Also, the radio network controller 142 can be configured with a remote radio unit (RRU) 160 for downlink and uplink channel processing. The RRU can be configured to communicate with a baseband unit (BBU) of a base station controller 131 via a physical communication link and communicate with a wireless mobile device via an air interface.

In various alternate embodiments, the base station controller 131 can be separated into two parts, the Baseband Unit (BBU) 139 and the Remote Radio Head (RRH) 141, that provides network operators to maintain or increase the number of network access points (RRHs) for the Node (gNB), while centralizing the baseband processing functions at a master base station 175. Using a master C-RAN base station 175 the power management system 170 can be instructed to coordinate operations in the tangent of power levels of multiple cells (121, 122, and 123).

Figure 2:
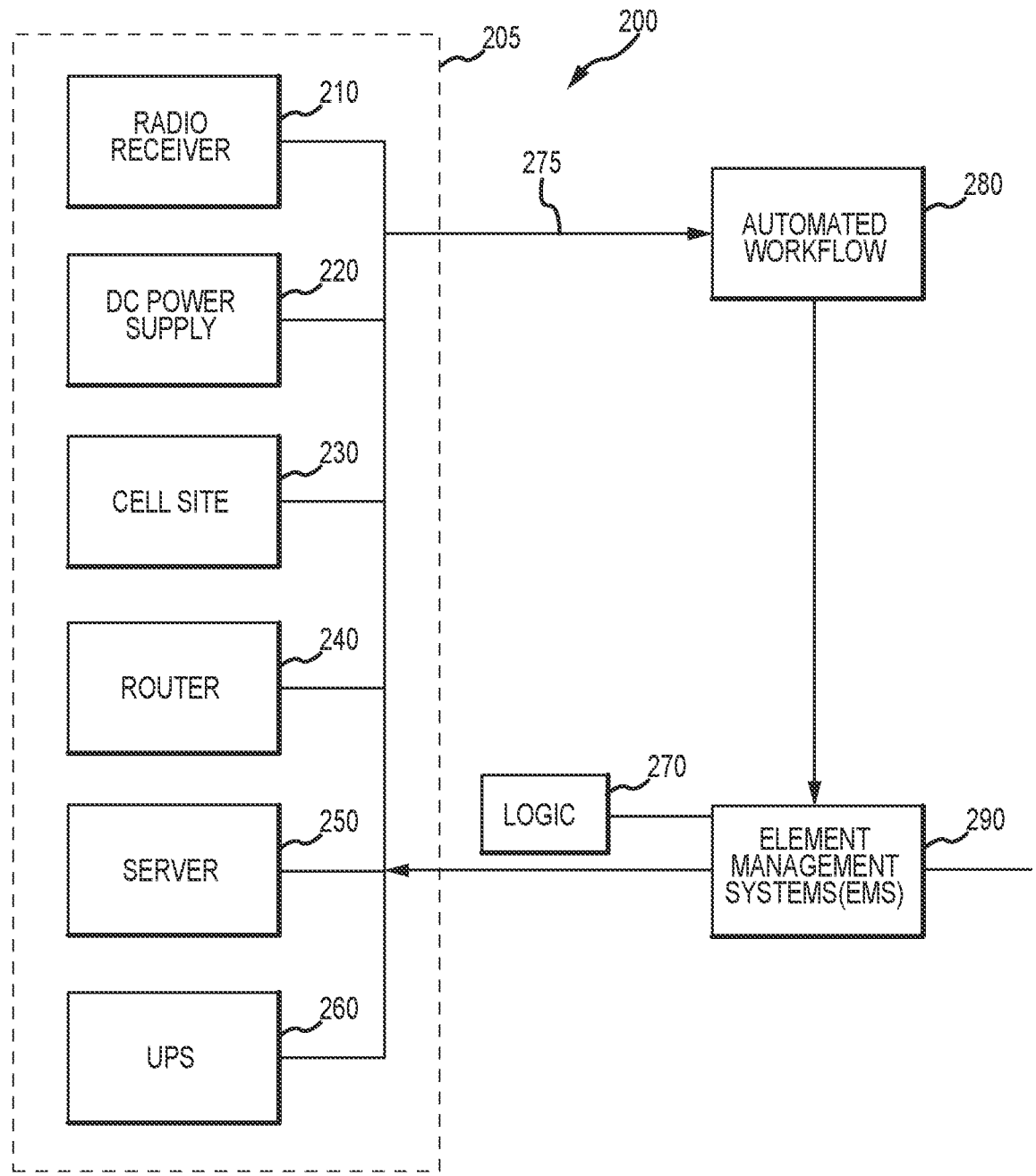
FIG. 2 is an exemplary diagram of a feedback communication loop for power management of a base station responsive to a commercial power interrupt or failure of the base station power management system in a wireless data networking environment in accordance with an embodiment.

FIG. 2 is an exemplary diagram of a feedback communication loop for power management of a base station responsive to a commercial power interrupt or failure of the base station power management system in a wireless data networking environment in accordance with an embodiment. In FIG. 2, wireless network 200 includes an RF radio receiver 210, DC power supply 220, a cell site 230, a random access channel (RACH) via router 240, server 250, UPS 260, logic 270 with backhaul channel communications, element management system 290, automated workflow 280 and uplink 275. The RACH is a channel shared among wireless devices to access the mobile network for call setup and data transmission bursts such as text messages. The automated workflow 280 manages the transmission network.

The automated workflow 280 instructs the element management systems (EMS) 290 which are directly connected via logic 270 to the components of the cell 205 of the radio receiver 210, the DC power supply 220, the cell site 230 node calls/dropped calls/throughput in operation, the server 250, and the UPS 260. The EMS 290 monitors and controls the various components of the cell 205 to maintain the quality of service (QoS) of the cell site 230. The automated workflow 280 maintains the network availability and monitors the status of network devices including the commercial power supplied to the network. The EMS 290 is connected to multiple eNodeB for power management. When a power outage in the network occurs, the automated workflow 280 which is monitoring the network instructs the element management system 290 via the logic 270 to reduce the output power of the radio receiver 210 and also takes into account other factors by communicating with the radio receiver 210, cell site 230 via the router 240 connected to the server 250 in reducing the output power for transmission. This in turns reduces the DC power from the DC power supply 220 and the draw on the UPS 260.

In an exemplary embodiment, the server 250 can be configured as NB-IoT Server is a software for data collection and monitoring and communicating via the router 240 for activating the automated workflow 280 via the EMS 290 and can display the log messages of each base station and the survival status of all sessions (including information such as signal, power, etc.).

FIG. 3 is an exemplary flowchart 300 for power management of a base station responsive to a commercial power interrupt or failure of the base station power management system in a wireless data networking environment in accordance with an embodiment.

In FIG. 3, at task 310, the automated workflow detects a loss of the commercial power in the network or to the input of a base station of a particular cell. The automated workflow performs functions related to fault management, a configuration of the directly connected components, and performance management. Security management functions may also be implemented with the automated workflow. The configuration management functions of the automated workflow can include change component operating settings via the element management system of a particular cell or set of cells. At task 320, after the detection of an interrupt of the commercial power, power failure, power loss, and/or power outage of the network, the automated workflow which is monitoring the components and the network detects the change and the power loss.

The automated workflow in response to the detected power loss implements the configuration management functions to change the settings of the output power of the radio receiver by either changing the radio receiver settings or cropping the input power to the radio receiver. At task 330, the element management system communicates with the radio receiver, the server, and other components at the cell site, to send messages via the cell site router to receiver collect cell statistics, and to execute appropriate plug and play functionality of the base station radio receiver. At task 340, the automated workflow executes various functions to the element management system based on decisions from the cell site and base station. The element management system is configured with functionality to set parameters of the base station components and can maintain consistency between multiple small cells. Hence, in the case of a loss of commercial power, the element management system can attempt to prevent traffic congestion and dropped calls by implementing collective scheduling between multiple cells. At task 340, the element management system reduces the output power of the radio receiver at the cell site.

As described, a data networking system includes several data processing components, each of which is patentable, and/or have patentable aspects, and/or having processing hardware capable of performing automated processes that are patentable. This document is not intended to limit the scope of any claims or inventions in any way, and the various components and aspects of the system described herein may be separately implemented apart from the other aspects.

The invention claimed is:

1. A system, comprising:
   a radio controller at a base station;
   a radio receiver at the base station and in electronic communication with the radio controller, wherein the radio receiver is configured to operate at a normal input power under a normal power condition at the base station;
   a battery at the base station, wherein the radio controller is configured to route power from the battery to the radio receiver; and
   an element management system located remotely from the base station and configured to communicate with a plurality of base stations,
     wherein the element management system instructs the radio controller to continue operating the radio receiver with a cropped input power from the battery to the radio receiver in response to a power interrupt at the base station,
     wherein the cropped input power is greater than zero and less than the normal input power,
     wherein the cropped input power to the radio receiver reduces a draw from the battery by the radio receiver during continued operation.

2. The system of claim 1, wherein the element management system is instructed by an automated workflow responsive to the power interrupt.

3. The system of claim 1, wherein the element management system changes settings of components at the base station based on data communicated from a server located at the base station.

4. The system of claim 1, wherein the element management system changes settings of components at the base stations based on collective data communicated from servers located at the base stations.

5. The system of claim 1, wherein the element management system monitors components at the base station using a data collected from the base station.

6. The system of claim 1, wherein the element management system is configured to reduce input powers at the plurality of base stations using a collective scheduling to maintain a quality of service in a coverage area of the base stations.

7. A method comprising:
   detecting, by an element management system located remotely from a base station, a power interrupt at the base station while operating a radio receiver at a normal input power;
   routing power from a battery at the base station to the radio receiver at the base station; and
   instructing a radio controller at the base station to crop the normal input power to the radio receiver and continue operating the radio receiver with a cropped input power from the battery to the radio receiver in response to the power interrupt at the base station, wherein the cropped input power is greater than zero and less than the normal input power, wherein the cropped input power to the radio receiver reduces a draw from the battery by the radio receiver during continued operation.

8. The method of claim 7, further comprising reducing an output power of the radio receiver by changing settings of components at the base station to reduce a maximum radio receiver load.

9. The method of claim 7, further comprising running an automated workflow that collects data from the base station in response to detecting the power interrupt at the base station.

10. The method of claim 9, further comprising changing settings of components at the base station based on the data communicated from a server at the base station.

11. The method of claim 7, further comprising changing, by the element management system, settings of components at a plurality of base stations based on collective data communicated from servers located at the base stations.

12. The method of claim 7, further comprising monitoring, by the element management system and remotely from the base station, components at the base station using a data communicated from a server at the base station.

13. The method of claim 7, cropping, by the element management system, input powers at a plurality of base stations based on a collective scheduling to maintain a quality of service in a coverage area of the base station.

14. A non-transitory computer-readable medium configured to store a set of instructions thereon that, when executed by a computer-based system, cause the computer-based system to perform operations, the operations comprising:

detecting, by an element management system located remotely from a base station, a power interrupt at the base station while operating a radio receiver with a normal input power;

routing power from a battery at the base station to the radio receiver at the base station; and instructing a radio controller at the base station to continue operating the radio receiver with a reduced input power from the battery less than the normal input power, wherein the reduced input power is greater than zero.

15. The non-transitory computer-readable medium of claim 14, wherein the operations further comprise cropping, by the element management system, input powers at a plurality of base stations based on a collective scheduling.

16. The non-transitory computer-readable medium of claim 14, wherein the operations further comprise reducing an output power of the radio receiver by changing settings of components at the base station.

17. The non-transitory computer-readable medium of claim 14, wherein the operations further comprise running an automated workflow in response to detecting the power interrupt at the base station.

18. The non-transitory computer-readable medium of claim 14, wherein the operations further comprise changing settings of components at the base station based on data communicated from a server at the base station.

19. The non-transitory computer-readable medium of claim 14, wherein the operations further comprise changing, by the element management system, settings of components at a plurality of base stations based on collective data communicated from servers located at the base stations.

20. The non-transitory computer-readable medium of claim 14, wherein the operations further comprise monitoring components at the base station using a data communicated by a server at the base station.

\* \* \* \* \*